United States Patent [19]

Haley et al.

[11] Patent Number: 5,612,928
[45] Date of Patent: Mar. 18, 1997

[54] METHOD AND APPARATUS FOR CLASSIFYING OBJECTS IN SONAR IMAGES

[75] Inventors: Paul H. Haley, Monroeville; James J. Oravec, Plum Boro; Walter J. Petlevich, Jr., Uniontown; Philipp F. Schweizer, Monroeville, all of Pa.

[73] Assignee: Northrop Grumman Corporation, Los Angeles, Calif.

[21] Appl. No.: 847,512

[22] Filed: May 28, 1992

[51] Int. Cl.$^6$ .................................................. G06K 9/00
[52] U.S. Cl. ........................ 367/11; 367/131; 382/103
[58] Field of Search ........................... 367/7, 131, 87, 367/135, 11; 382/36, 14, 16, 39, 43, 54, 103, 199, 205, 291, 156; 358/112; 348/163

[56] References Cited

U.S. PATENT DOCUMENTS

| | | | |
|---|---|---|---|
| 5,181,254 | 1/1993 | Schweizer et al. | 367/131 |
| 5,214,744 | 5/1993 | Schweizer et al. | 382/36 |

OTHER PUBLICATIONS

Philipp F. Schweizer and Walter J. Petlevich, "Automatic Target Detection and Cuing System for an Autonomous Underwater Vehicle (AUV)", Proceedings of Sixth Symposium on Unmanned, Untethered Submersibles, Oct. 1989.
S. Y. Kung and J. N. Hwang, "A Unified Systolic Architecture for Artificial Neural Networks", Journal of Parallel and Distributed Computing 6, 358–387 (1989).

Dean A. Pomerleau, George L. Gusciora, David S. Touretzky and H. T. Kung, "Neural Network Simulation at Warp Speed: How We Got 17 Million Connections Per Second", Proc. 1988 IEEE Int'l. Conf. on Neural Networks, pp. 143–150.

Akira Iwata, Yukio Yoshida, Satoshi Matsuda, Yukimasa Sato and Nobuo Suzumura, "An Artificial Neural Network Accelerator Using General Purpose 24–Bits Floating Point Digital Signal Processors", Proc. 1989 IEEE Int'l Joint Conf. on Neural Networks, pp. II–171–175.

*Primary Examiner*—Daniel T. Pihulic
*Attorney, Agent, or Firm*—Walter G. Sutcliff

[57] ABSTRACT

A method and apparatus for classifying objects in images utilize means for selecting portions of those images which contain objects and means for classifying those objects based upon parameters of the selected portions, which parameters are useful for classifying the objects. The selecting means preferably is a shadow and highlight detector, a statistical window detector and a neural network window detector whose output is combined in a combined cuer. The parameters are determined from the greylevels and positions of pixels using one or more modules which perform certain mathematical operations on this data. Such parameters include edge parameters, smoothness, clutter, presence and characteristics of highlights and shadows, and texture. The invention is particularly useful for classifying objects in sonar images as natural or man-made.

20 Claims, 5 Drawing Sheets

METHOD AND APPARATUS FOR CLASSIFYING OBJECTS IN SONAR IMAGES

FIELD OF INVENTION

The invention relates to a system for classifying objects in sonar images as either man-made objects or natural features.

BACKGROUND OF THE INVENTION

Sonar has long been used for detecting objects on the ocean bottom. A sonar image typically is comprised of a matrix of points or picture elements (pixels) displayed on either a cathode ray tube or paper. The points or pixels have a greyness level ranging from 0 to 255 on a greyness scale. Objects normally appear on sonar images as a highlight shadow combination, particularly when the sonar images are generated by a moving vehicle. A sonar scan for short distances typically comprises a massive amount of data which must be reviewed in short time periods. Prior to the present invention this review was done by human analysts looking at the sonar scans. As the analyst reviews the scans he marks areas where he has inferred specific objects or features may be present on the ocean bottom. Because of the massive amounts of data that must be reviewed in short time periods, human analysts are subject to frequent errors or omissions in both detection and classification.

Reliable automatic, machine discrimination between man-made and natural objects in sonar images has not been achieved in the past. Machine processing methods developed for photograph and video images do not work well for noisy sonar images.

Sonar images differ in two major ways from video images. Sonar images contain much more noise than video images. The noise is multiplicative and the signal to noise ratio is much lower. Secondly, sonar images in general contain much less information about an object than do video images. Thus, image segmentation techniques based on edge detection, gradient thinning and texture recognition do not work reliably. Without specific shapes to find, template matching is useless. Moreover, sonar images are highly aspect angle and grazing angle dependent so that the same object will appear differently when viewed from different angles and ranges.

The relatively low information content of these images is another reason that previous attempts at machine classification of objects in sonar images as man-made or natural have failed. Even human analysts have difficulty doing this and often make mistakes.

Accordingly, there is a need for an automatic target cuing system for sonar images. The system must have extremely high throughput rates of many hundreds of thousands of sonar picture elements (pixels) per second. Such high rates preclude the use of complicated algorithms on single CPU architectures. Finally, the system should have applicability beyond sonar images to video pictures and other images comprised of a matrix of pixels having known greyness levels.

SUMMARY OF THE INVENTION

We have developed a method and apparatus for analyzing and classifying selected portions within sonar and other images as man-made objects or natural features. These selected portions typically contain highlight and shadow combinations, highlights alone and/or shadows alone. Our method and apparatus utilize a means for selecting portions of the images called snippets and a scene classifier for classifying one or more features within those snippets as man-made objects or natural features. To select the snippets we prefer to use a shadow-highlight detector, a statistical window detector and a neural network detector which receive and review the image for objects based upon the greyness level of pixels in the image. These detectors generate an output which identifies the location and characteristics of detected objects. We call these detections snippets. Outputs from the three detectors are combined in a combined cuer which compares the snippets selected by the three detectors and selects those snippets which are to be passed on to the scene classifier.

The scene classifier preferably contains six modules which develop selected characteristics of the selected snippets and a Bayesian Classifier which receives and utilizes those characteristics from the modules to classify at least one feature within the selected snippet as man-made or natural. The classifier then provides an output which can be used to mark the locations of the selected snippets on the sonar image and state whether objects within the image are man-made or natural. Typically, marking is done by drawing a box on the image corresponding to the area of the snippet and printing "natural" or "man-made" within the box.

Other details, objects and advantages of our method and apparatus for classifying objects in images will become apparent as a description of present preferred embodiments proceeds.

DESCRIPTION OF THE PREFERRED EMBODIMENTS

Many types of images are created by a matrix of dots or pixels of varying shades of grey. Such images include black and white newspaper photographs, fingerprints, black and white television pictures, sonar images and other types of video displays. Although our method and apparatus can be used for any image comprised of a matrix of pixels having known greyness levels, they are particularly useful for sonar images. Accordingly, we will describe our system in the context of sonar images. However, it should be understood that our method and apparatus is not limited to sonar images but is applicable to other types of pixel-formed images.

A sonar image is comprised of a matrix of pixels having a greyness level typically on a scale from 0 to 255. Combinations of dark pixels called shadows and light pixels called highlights typically correspond to an object on the bottom of the ocean. Objects may also be represented in the image by highlights or shadows alone. In U.S. patent application Ser. No. 07/628,115 filed Dec. 14, 1991, we disclose an automatic method and apparatus for identifying targets from identification of highlights and shadows in a sonar image. This system, however, cannot distinguish between natural and man-made objects. The present invention, however, overcomes that limitation.

Figure 1:
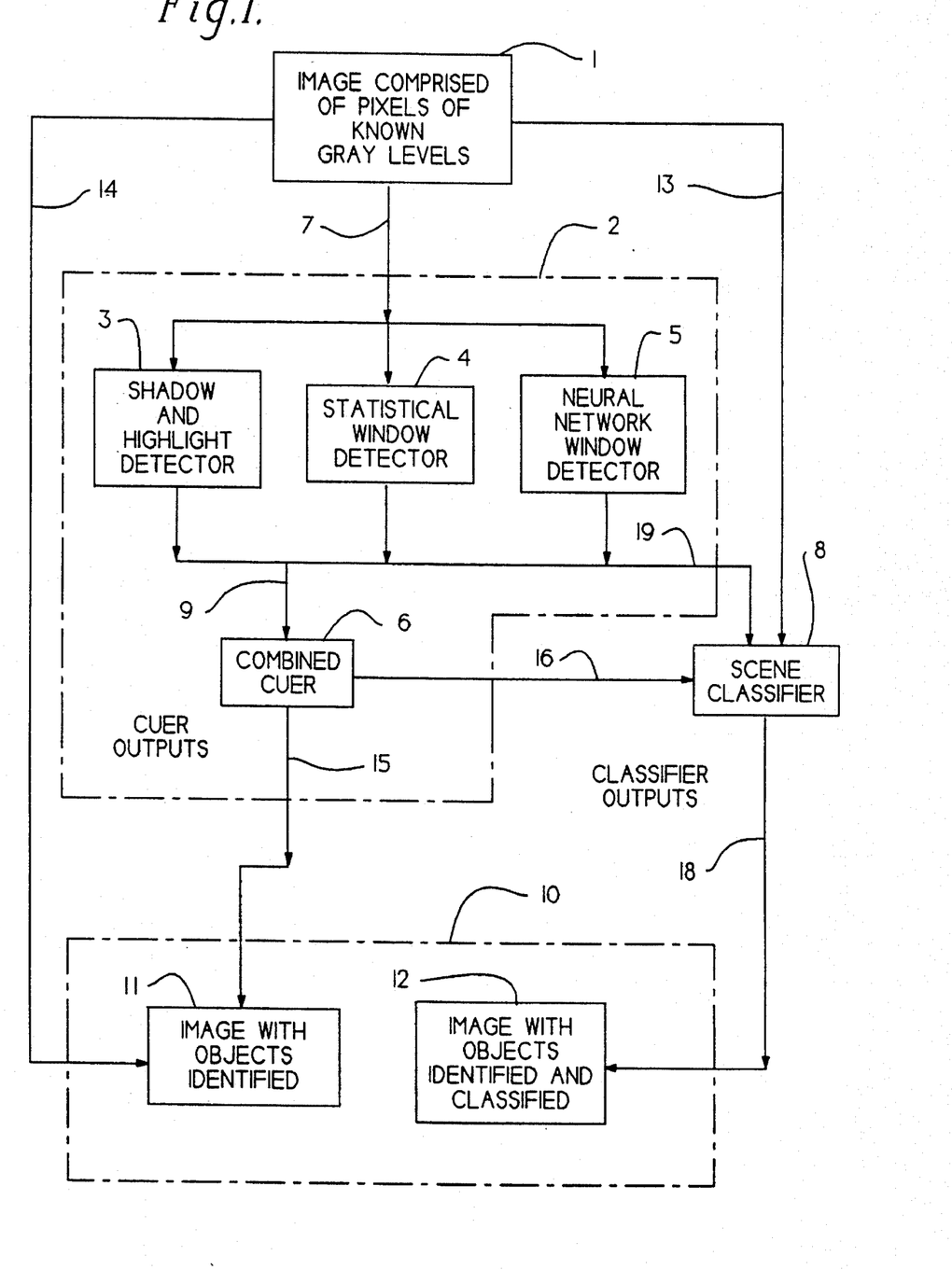
FIG. 1 is a block diagram showing our present preferred system for selecting and classifying objects in an image comprised of pixels having known greyness levels.

Referring to FIG. 1, our system requires an image indicated by rounded box 1. This image is comprised of a matrix of pixels each having a known greylevel. Such images are typically digitized so that the location and greylevel of each pixel is expressed by a set of numbers. Digitized images are well known in the art. Therefore it is unnecessary to explain the methods and devices used to create a digitized image from a photograph or other display. Image 1 expressed in digital form is input into means 2 for identifying portions of the image called snippets which contain objects to be classified. The preferred means 2 for identifying such snippets is comprised of a highlight and shadow detector 3, a statistical window detector 4, a neural network window detector 5 and a combined cuer 6. The details of the operation of our preferred means 2 for selecting snippets is explained in pending U.S. patent application Ser. No. 07/625,115 filed Dec. 14, 1991, which is incorporated by reference.

The four detection processes (highlight-shadow, statistical, neural network, and combined cuer) operate on the image 1 and display intermediate results by modifying pixels in the image and/or by displaying graphical overlays. A resulting image 11 can be created by display means 10 which could be a printer, screen or cathode ray tube. That image would look like the image depicted in FIG. 9 without the object labels. The four detection processes can be implemented with the well-known C Language, compiled and executed on a Sun 68020 CPU board. Eight megabytes of memory are used by the Sun to store programs and intermediate results. One could also use other processing units and memory combinations available from well-known suppliers Data Cube, Force Computers, FDS, ERIM, Mercury/Numerix, Intel, Inmos, and Paracom.

The means 2 for identifying snippets receives the digitized image as indicated by arrow 7. This information is simultaneously processed through a neural network detector 5, statistical window detector 4 and highlight-shadow detector 3. The operations of these detectors are described in U.S. patent application Ser. No. 07/628,115 filed Dec. 14, 1991. These operations produce data corresponding to detected objects which is input as indicated by arrow 9 and combined in combined cuer 6. The detection data and the combined data are output to scene classifier 8 as indicated by arrows 16 and 19. The combined data may also be sent to a display means 10 as indicated by arrow 15. The display means 10 may combine that data with the original image 1 to produce an image 11 with objects identified but not classified. To produce image 11 the display means 10 would combine the output from the combined cuer 16 with the original image, receipt of which is indicated by arrow 14.

Figure 9:
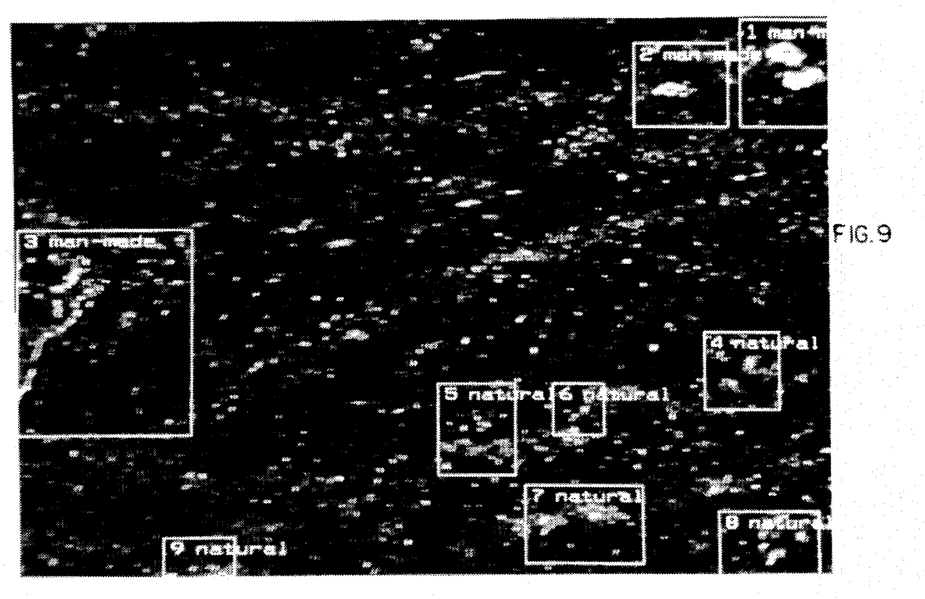
FIG. 9 is a sonar image marked to identify objects classified by our method and apparatus.

We provide a scene classifier 8 which receives the original image (arrow 13), the detections (arrow 19) and the combined cuer output (arrow 16). From that data the scene classifier determines whether the detections correspond to natural or man-made objects and then outputs (arrow 18) to a display means 10 data to produce an image 12 which corresponds to the original image 1, but which also contains objects identified and classified thereon. FIG. 9 is an example of such an image wherein a box is drawn around snippets containing identified objects. In FIG. 9 the boxes are sequentially numbered and each box is labeled as containing man-made objects or natural objects.

Figure 2:
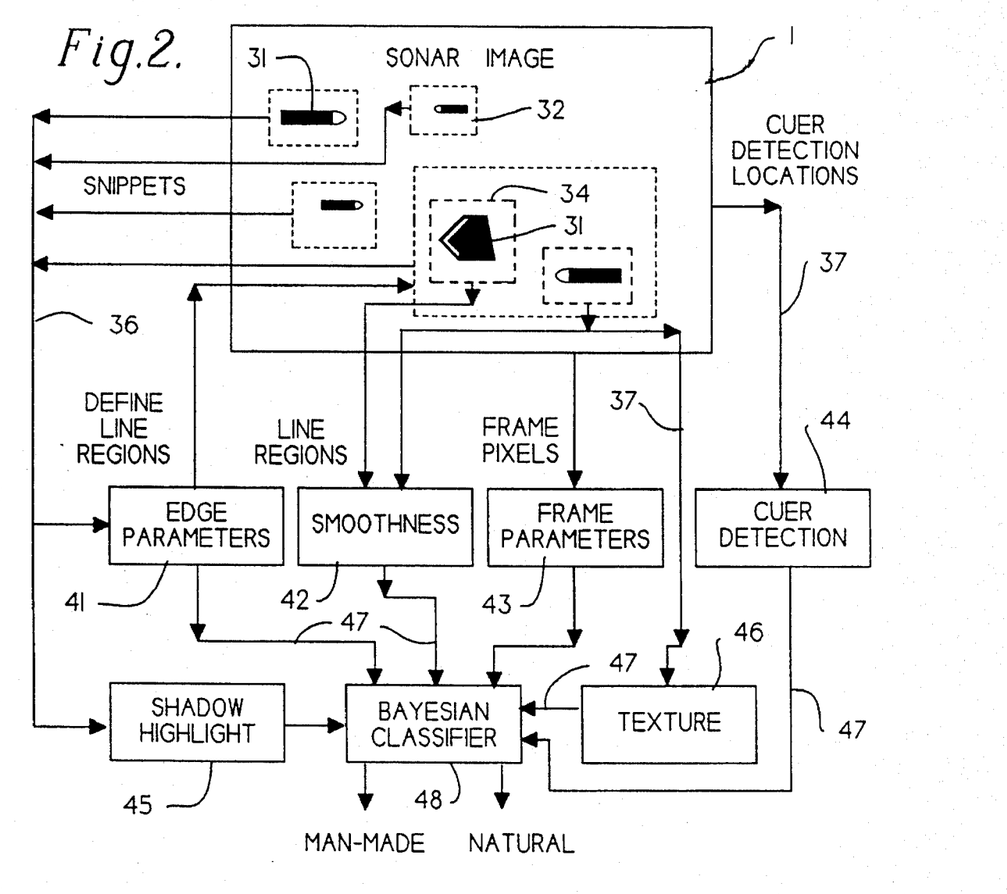
FIG. 2 is a block diagram of the scene classifier used in our system diagramed in FIG. 1.

The scene classifier is composed of six parameter extraction modules and a Bayesian Classifier module as shown in FIG. 2. The objective of the scene classifier is to designate the detected areas as man-made or natural by operating on frame and combined cuer data.

The input data is composed of pixel greylevel segments of the sonar image which are called snippets, detection window size and location data from the combined cuer, and frame pixels of sufficient size to characterize the background. This data is used to drive the six major classifier functions described below. These functions are performed in modules which receive data as indicated in FIG. 2. A sonar image 1 is shown in FIG. 2 as containing objects 31 within regions 32 called snippets. The snippets are indicated by dotted-line boxes. Within each shipper 32 there may be one or more objects 31. Around each object one can define line regions 34 indicated by dotted-line boxes. We provide an edge parameter module 41, a smoothness module 42, a frame parameter module 43, a cuer detection module 44, a highlight and shadow module 45 and a texture module 46. All of the modules except the cuer detection module receive data corresponding to the snippets 32 as indicated by arrows 36. The cuer detection module only receives the locations of the snippets indicated by arrow 37. Each module performs certain operations on the data it receives and generates an output indicated by arrows 47 to a Bayesian Classifier 48. The Bayesian Classifier determines from the data received from the modules whether an object is man-made or natural. Having thus provided an overview of the operation of the scene classifier, a detailed description of each of the modules and the Bayesian Classifier can now be provided.

Frame Parameters Module

The frame parameters are derived from the total frame pixels and consist of clutter and histogram statistics. Clutter is derived from the convolution of a two dimensional filter with the frame. The spatial frequency response of the filter is given as the difference of two Gaussian functions, $$H(f) = \exp[-(f/2f_o)^2] - \exp[-(f/f_o)^2] \tag{1}$$

such that H(f) implements a bandpass filter. The number of regions in the filtered image above a given threshold are computed and these detections are then divided by the number of pixels in the frame to yield the clutter parameter. The filter of equation (1) is efficiently implemented by alternately smoothing and down-sampling until the desired frequency band is reached. Clutter is an input variable to the Bayesian Classifier function.

Three histogram statistics are also derived from the frame. Those statistics are image mean, image standard deviation, and mean shift. Image mean and image standard deviation have the usual definition. Mean shift is the greylevel value at which the cumulative histogram exceeds a small fraction ($\sim 10^{-4}$) of its final value. Some histograms have a spike at zero greylevel and then an interval of zero values before positive values are encountered. Depending on the application, the spike at zero greylevel is either used or deleted in computing the mean shift. The histogram statistics are used for setting various thresholds in the definitions of the Bayesian Classifier parameters. For instance, they are used to set the threshold that defines the detections in the clutter calculation. They are not explicitly used in the Bayesian Classifier inputs.

Cuer Parameters Module

The data described as cuer data consists of the number of detections from each of three cuers and the area and centroid of each combined cuer detection. The input data from the cuer parameter module to the Bayesian Classifier consists of the number of detections from each of the three cuers, the number of combined cuer detections, and derived data. Two of the derived data consist of the average area of combined cuer box detections and the standard deviation. Two more of the derived data are based on the centroid points of the combined cuer box detections. For each centroid point the nearest neighbor distance is computed. Then the mean and standard deviation of these distances are also computed and the ratio of the standard deviation to the mean is used as an input value to the Bayesian Classifier. The other parameter is gotten by first computing the matrix of second order moments of the centroid point distribution. The ratio of the smaller eigenvalue to the larger eigenvalue of this two by two matrix serves as another derived value of this block to the Bayesian Classifier.

Highlight/Shadow Module

The highlight and shadow parameters are computed on a snippet by shipper basis. A snippet is defined as a contiguous pixel area determined by the combined cuer locations. A highlight is an area of at least 30 pixels which has a threshold $t_H$ defined below. A shadow is an area of at least 50 pixels which has a threshold $t_s$ also defined below. Thresholds to define these highlight-shadow blobs are based on the frame statistics such that $$t_H = \mu + 2.83\sigma \quad (2)$$

and $$t_s = \Delta\mu + 0.37(\mu - \Delta\mu) \quad (3)$$

where $\mu$, $\sigma$, and $\Delta\mu$ are the mean, standard deviation and mean shift. Using these values a region growing algorithm finds the following values.

For a Highlight whose area is greater than 30 pixels:

$A_H$=Area $I_H$=Average greylevel value over $A_H$

For a Shadow whose area is greater than 50 pixels:

$A_s$=Area $x_s$=Vertical extent $Y_s$=Horizontal extent $P_s$=Perimeter $I_s$=Average greylevel value over $A_s$ Similar values denoted with a subscript H can be found for highlights. However, only $A_H$ and $I_H$ have been useful in classifying sonar images.

From these the following input parameters to the Bayesian Classifier are computed. A blob is defined as a contiguous area of pixels with the same uniform property, e.g., all the pixels have the same greylevel range.

To determine highlights we find the maximum area blob and compute:

$$A_H/50 \quad (4)$$

$$H = (I_H + 1 - t_H)(A_H/30)/\sigma \quad (5)$$
$$= \text{highlight intensity}$$

We also count the number of highlight blobs and find the total area of highlight blobs.

We compute six shadow attributes: shadow quality (sq), shadow area ($A_s$) shadow depth (D), shadow width ($x_s$), shadow height ($Y_s$) and shadow compactness (C).

To determine shadow quality, we find the minimum value of:

$$sq = (r_s + r_s^2)(50/A_s)^{1/2} = \text{shadow quality} \quad (6)$$

where $$(r_s = x_s/y_s) \quad (7)$$

We also find the largest area shadow blob and compute:

$$Ahd\ s/50 \quad (8)$$

Shadow depth D is calculated from:

$$D = \frac{(t_s + 1 - I_S)}{(\mu - \Delta\mu)} \cdot \frac{A_s}{50} \quad (9)$$

$$x_s, y_s \quad (10)$$

Shadow compactness C is calculated from:

$$C = \frac{4\pi A_s}{P_s^2}$$

In this module we also determine the number of shadow blobs and the total area of shadow blobs.

Edge Parameter Module

Linear edges are an important discriminant and also define regions where smoothness and texture operators are applies. An edge preserving smoothing operation is first performed on the shipper of interest. Eight greylevel averages using pairs of a pixel's eight nearest neighbors are computed. The average with the least variance from the center pixel's greylevel replaces the greylevel of the center pixel. Next edge detecting in the vertical and horizontal direction is done producing two gradient images. Edge thinning by search for local maximum of the gradient images is the next process. Binary images are made from these local maxima and a single binary edge image is obtained by "OR" ing these.

Using the Hough transform, the binary image is mapped into a two dimensional array representing the $(r,\theta)$ plane. If the shipper has a straight line at a radial distance $r_o$ from the shipper centroid at an angle $\theta_o$ with respect to the x-axis, then the Hough transform array will have a local maximum near $(r_o, \theta_o)$.

Straight lines meeting length and straightness criteria are then detected using the following procedure:

1. Search $(r,\theta)$ array for peak element and compute equation of straight line corresponding to this point.
2. Search binary edge array for all points within a certain tolerance of this line. We prefer to use a tolerance between 0.75 and 0.95 pixels.
3. Refine equation of straight line and research binary edge array.
4. Identify line segments meeting straightness, length and density requirements. These values depend upon the type of image and can be found experimentally. For sonar images we prefer to ignore lines less than 6 pixels and having a density of less than 0.8.
5. Record position, rms error to straight line, number of points, total length of segments.
6. Perform Hough transform on these line segments and subtract this transform from the current Hough transform.
7. Repeat steps 1 through 6 until maximum of $(r,\theta)$ array falls below a minimum threshold.

The straightness of the snippet is found using the lines found above and the following steps:

1. Determine a bounding box for every line segment such that the minimum dimension of the box is at least ½ of its maximum dimension.
2. Find regions of overlapping bounding boxes. Determine a bounding box for each region, record size and position of each region.

3. Compute straightness parameter for each region using data found in step 5 above and the following formulae.

(a) For each line i in a region having length $l_i$, rms error $e_i$ and total number of points $np_i$ compute:

$$eps_i = \min(1, t_i) \quad (11)$$

where $a_i = \max(0.2, e_i)$
$d_i = (np_i - 1)/l_i$
$b_i = \max(d_i, 1/d_i)$
$c_i = \min(1, 6/npi_i)$
$t_i = a_i\, b_c\, c_{i\, di}$ (b) For each region, order the $eps_i$ in ascending order and compute the straightness of the region using at most the five smallest values of $eps_i$ where:

Straightnes $S = (t_1^{-2} + t_2^{-2} + \ldots + t_5^{-2})^{-\frac{1}{2}}$ (c) The straightness of the shipper is the minimum value of S over the line regions in the snippet.

Straightness is an input parameter to the Bayesian Classifier.

Smoothness Parameter Module

Figure 3:
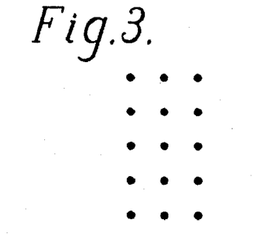
FIGS. 3 through 6 show four position patterns of the type used to calculate smoothness.
Figure 4:
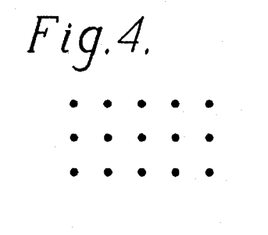
Figure 5:
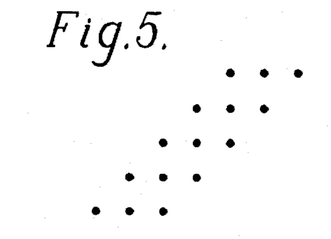
Figure 6:
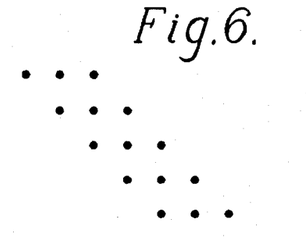

Smoothness, a texture parameter, measures pixel greylevel uniformity in four directions using the four position patterns of FIGS. 3 through 6. FIG. 3 is a vertical pattern. FIG. 4 is a horizontal pattern. FIG. 5 is a 45° right pattern. FIG. 6 is a 45° left pattern. Each pattern defines 15 positions in terms of 3 rows of five pixels each. For each possible position of a pattern within a line region of a snippet, the mean and standard deviation from the mean of the pixels touched by the pattern is computed. The minimum ratio of the standard deviation divided by the mean is computed for all positions of all four patterns within a line region. This defines the smoothness of the line region. The minimum value of the smoothness overall line regions defines the smoothness of the snippet. Smoothness is an input parameter to the Bayesian Classifier.

Since straightness and smoothness are good discriminators of man-made versus natural objects, combining them within the shipper to produce a single combined variable produces an even better discriminator. Letting $S_i$ be the straightness of line region i and $sm_i$ be the smoothness of line region i, two useful combinations are:

Planar:

$$rp_i = (5\, S_i + 3\, sm_i)/8 \quad (13)$$

and
Hyperbolic:

$$rh_i = [S_i\, (sm_i + 0.06)]^{1/2} \quad (14)$$

The minimum of $rp_i$ over the snippet yields the parameter rp while the minimum of $rh_i$ over the snippet yields rh. Either of these parameters can serve as inputs to the Bayesian Classifier.

Texture Parameters Module

Three basic approaches to texture recognition are:

1. Convolution with templates to detect dots, lines and edges
2. Computation of co-occurrence matrices
3. Applying two dimensional Fourier transforms We prefer to use these templates for detecting the texture parameters "dot-ness", "line-ness" and "edgeness":

$$\begin{bmatrix} -1 & -1 & -1 \\ -1 & 8 & -1 \\ -1 & -1 & -1 \end{bmatrix}$$
dot-ness $$\begin{bmatrix} -1 & -1 & -1 \\ 2 & 2 & 2 \\ -1 & -1 & -1 \end{bmatrix}$$
line-ness $$\begin{bmatrix} -1 & -2 & -1 \\ 0 & 0 & 0 \\ 1 & 2 & 1 \end{bmatrix}$$
edge-ness The templates shown for line-ness and edge-ness detect a horizontal orientation. Simple rotation of these templates will detect patterns with different orientation.

A parameter suitable for input to the Bayesian Classifier is gotten in the following way:

1. The template is convolved with a line region of the snippet producing a second image.
2. The standard deviation of this second image is computed and normalized by the standard deviation of the frame to produce a single parameter characterizing the line region with respect to the texture parameter.
3. The maximum of this parameter over all of the line regions yields the parameter value of the snippet to be given to the Bayesian Classifier.

A second method for producing texture parameters is the use of co-occurrence matrices. A co-occurrence matrix is a two dimensional histogram of a joint probability distribution of the greylevels of two points displaced by a constant vector amount. Let point A have indices (i,j) and point B have indices (i+a, j+b) where a and b are constant. The co-occurrence matrix $M(s,t)_{ab}$ is indexed by s and t over the range of greylevels and is computed as follows:

1. Set all elements of $M(s,t)_{ab}$ to zero.
2. Normalize greylevel of subimage by mean of frame.
3. For each pixel (i,j) in the normalized subimage (usually the line region of a snippet) increment $M(s,t)_{ab}$ where s is the greylevel of pixel (i,j) and t is the greylevel of pixel (i+a, j+b).
4. Normalize $M(s,t)_{ab}$ by dividing it by the sum of all of its elements after all pixels of the subimage have been processed.

Certain index sets of the co-occurrence matrix will be indicative of man-made or natural objects. A single parameter characterizing the line region can be gotten by summing the elements of $M(s,t)_{ab}$ over the appropriate index set. Then a value for the entire snippet may be gotten by taking the minimum, the maximum or the average of the line region parameters. This end value is then used as a measure of the texture of the snippet and is an input parameter to the Bayesian Classifier.

A third kind of texture measure is based on the two dimensional Fourier transform. Again, the method will be described in terms of a line region of the snippet. The method is based on averaging the two dimensional transform taken over a number of windowed areas in the line region. Let a suitable window be chosen say 4 by 4 or 4 by 8 pixels in rows and columns. Then do the following:

1. Start the window in the upper left corner of the line region and compute the two dimensional Fourier transform of the greylevels.

2. Successively move the window using 50% overlap in rows and columns computing the two dimensional transforms until the entire line region has been covered.
3. Compute the magnitude squared of all of the above transforms and average them producing a single real two dimensional array F(x,y) where F(o,o) corresponds to the constant or zero frequency component.
4. Normalize the array F(x,y) by either the frame mean or F(o,o).

Again, as with the co-occurrence matrix, certain frequency regions will be useful in discriminating between man-made and natural objects. To get a single texture measure for the line region sum the elements of F(x,y) over a specific frequency region. A texture measure for the entire snippet may be gotten by taking the minimum, the maximum or the average of the individual line region texture parameters. Display of the two dimensional arrays $M(s,t)_{aa}b$ and F(x,y) as images or as three dimensional perspective plots when averaged over known man-made or natural objects can be used to determine the appropriate regions of these arrays that discriminate between these two classes.

Bayesian Classifier

The Bayesian Classifier accepts input from the six modules previously described and classifies the shipper as containing man-made or only natural objects. Let the data be arranged in a vector x and let:

f(x|M) be the probability distribution of x given that the snippet contains man-made objects and f(M|N) be the probability distribution of x given that the shipper contains only natural objects.

Then the probability that x comes from a snippet containing man-made objects is:

$$P(M|x) = f(x|M)/[f(x|M) + f(x|N)] \quad (15)$$

The Bayesian Classifier computes P(M|x) and then declares the object man-made if $$P(M|x) \geq r_B \quad (16)$$

where $r_B$ is a specified threshold.

The distribution functions f(x|M) and f(x|N) are derived using the following procedure:

1. Run cuers and shipper classifier modules over a wide range of images collecting sample values of the vector x.
2. Manually review detected snippets using an expert analyst to rate each one as man-made or natural.
3. Separate snippet data into the two classes of man-made and natural.
4. For each component of x, determine whether it is a suitable discriminator and select the best.
5. Perform transformations on the selected components of x such that the transformed component is approximately normally distributed.
6. Fit multivariable normal distributions to the transformed components to get f(x|M) and f(x|N).

Figure 7:
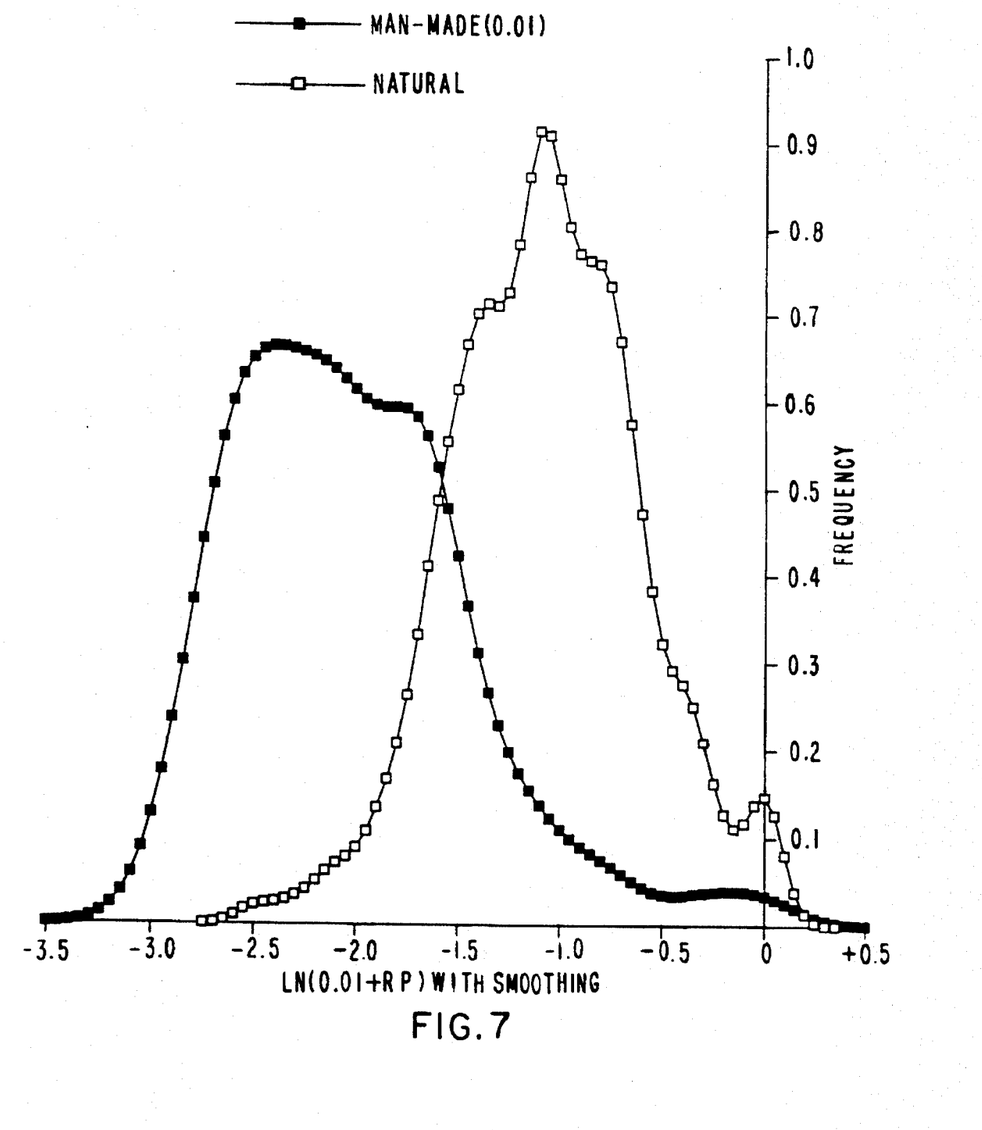
FIG. 7 is a graph showing a histogram of a man-made object and a histogram of a natural object.

The first three steps are straightforward and need no explanation. Selection of suitable variables can usually be done by computing means and standard deviations conditioned on man-made or natural. Plotting the conditional histograms as in FIG. 7 also is a useful tool for determining the suitability of a component. The plots of FIG. 7 are smoothed histograms for the combined straightness/smoothness parameter rp. A wide spread in means relative to the standard deviations indicates a good parameter for discriminating between man-made and natural objects.

Note that the abscissa of FIG. 7 is ln(0.01+rp) rather than rp. Plotting the histogram as a function of rp produced a skewed distribution. Usually a log transform with an additive constant will produce a distribution close enough to normal for use. If the original histogram is bimodal then splitting the distribution and approximating it with two normal distributions conditioned on the value of the component is the better approach. Formally, if G(y) is the cumulative probability function of a statistic y and F(y) is the cumulative normal distribution, then $F^{-1}(G(y))$ is a mapping producing a normally distributed variable from y.

These ideas can be clarified with an example. A classifier was designed using data from the three cuers operating on 145 sonar images involving over 200 examples of man-made objects and over 600 examples of natural objects. From the set of previously described classification variables the following subset of seven variables was chosen.

Primary Classifier Variables rp: combination straightness/smoothness

H: highlight intensity

D: shadow depth

C: shadow compactness sq: shadow quality $v_{ext}$: vertical extent of shadow $h_{ext}$: horizontal extent of shadow Combining these and transforming resulted in the five derived variables.

Derived and Transformed Variables $x_1 = \ln(0.01 + rp)$

For H > 0

$x_2 = \ln(H)$

For D > 0

$x_3 = \ln(sq)$ $x_4 = \ln(v_{ext}/h_{ext})$ $x_5 = \ln(D \cdot C)$

The straightness/smoothness variable ranged from zero to one in a continuous fashion with a default value of one when no line regions existed. Hence $x_1$ was continuous under the shifted log transformation. A significant number of cases of no highlight or no shadow occurred so that the remaining four derived variables were conditioned on H or D being nonzero. This led to the eight multivariate normal probability density functions of Table 1.

TABLE 1

Definition of eight multivariate normal distributions.

| Classifier and Derived Variables | Man-made Distribution Parameters | Natural Distribution Parameters |
|---|---|---|
| H = 0, D = 0<br>$x_A = x_1$ | $n_{AM}, \mu_{AM}, \Sigma_{AM}$ | $n_{AN}, \mu_{AN}, \Sigma_{AN}$ |
| H > 0, D = 0<br>$x_B^T = [x_1\ x_2]$ | $n_{BM}, \mu_{BM}, \Sigma_{BM}$ | $n_{BN}, \mu_{BN}, \Sigma_{BN}$ |
| H = 0, D > 0<br>$x_C^T = [x_1\ x_3\ x_4\ x_5]$ | $n_{CM}, \mu_{CM}, \Sigma_{CM}$ | $n_{CN}, \mu_{CN}, \Sigma_{CN}$ |
| H > 0, D > 0<br>$x_D^T = [x_1\ x_2\ x_3\ x_4\ x_5]$ | $n_{DM}, \mu_{DM}, \Sigma_{DM}$ | $n_{DN}, \mu_{DN}, \Sigma_{DN}$ |

The numbers $n_{AM}$, $n_{AN}$, etc. are the number of examples of each of the eight possible classes in the data set. The symbols μ and Σ are the vector means and covariance matrices of the appropriate derived vectors.

For instance $$\mu_{DM} = E\{x_D|M\}$$

$$\Sigma_{DM} = E\{(x_D - \mu_{DM})(x_D - \mu_{DM})^T|M\}$$

The Bayesian Classifier was implemented by first determining the appropriate class and then computing the two conditional distributions for use in equation 15. For example, suppose that for a particular snippet H=0 and D>0. Then $$x = x_C$$

$$f(x|M) = \left(\frac{n_{CM}}{n_{CM} + n_{CN}}\right) \frac{\exp[-1/2\,(x_C - \mu_{CM})^t \Sigma_{CM}^{-1}(x_C - \mu_{CM})]}{(2\pi)^{4/2}\,|\Sigma_{CM}|^{1/2}}$$

and $$f(x|N) = \left(\frac{n_{CN}}{n_{CM} + n_{CN}}\right) \frac{\exp[-1/2\,(x_C - \mu_{CN})^t \Sigma_{CN}^{-1}(x_C - \mu_{CN})]}{(2\pi)^{4/2}\,|\Sigma_{CN}|^{1/2}}$$

where $|\Sigma_{CM}|$ denotes the determinant of $\Sigma_{CM}$

Figure 8:
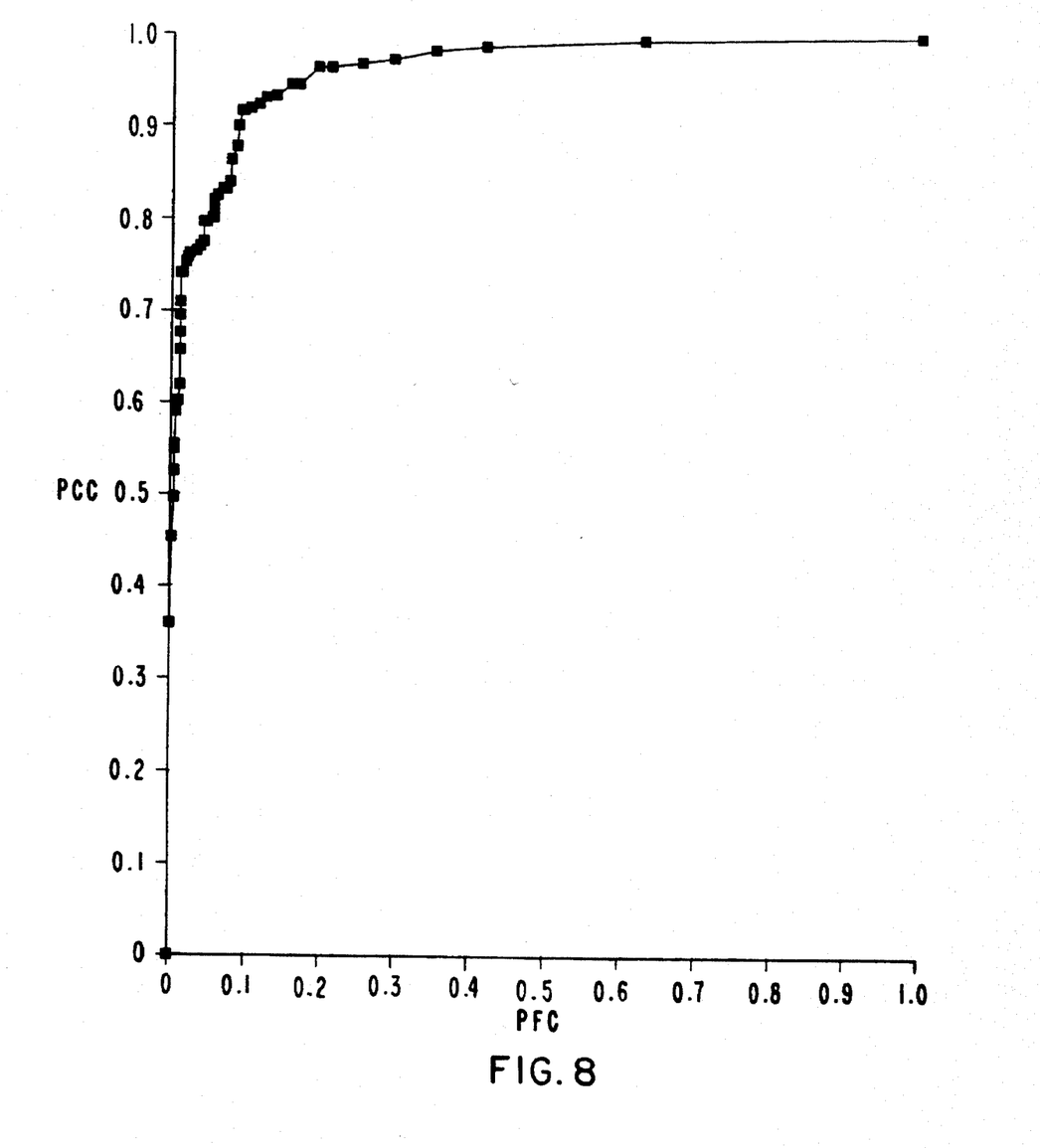
FIG. 8 is a graph of a classifier operating curve.

FIG. 8 shows the operating curve for a classifier based on the previously mentioned data set. PCC is the probability of correctly classifying a man-made object as man-made while PFC is the probability of classifying a natural object as man-made. The improvement of system performance by the classifier is obvious.

Although we have used our system to identify man-made objects and natural objects in images, the system could also be used to identify or classify other objects in images. For example, suppose one wants to determine if a particular object or group of objects appears in a series of videotapes. One would determine which of the several factors from the modules are applicable to the object or group and select those factors which are suitable discriminators. Then one would establish a probability equation as was done for the sonar image. That equation would then be applied by the Bayesian Classifier to determine the presence of the objects of interest.

Our system can also be used to determine the presence of certain features in images which may not correspond to an object. For example, one may want to know which of several thousand fingerprints in a file have a distinctive loop or other pattern which appears in a fingerprint found at a crime scene. As in the previous situations, one would select suitable discriminating factors, establish a probability equation and utilize our system to review the fingerprint file and select qualifying prints. Our system could also be used to compare an image to file images for face recognition.

Although we have described and illustrated a present preferred system and method for classifying objects in sonar images, it should be distinctly understood that our invention is not limited thereto but may be variously embodied within the scope of the following claims.

We claim:

1. A scene classifier for classifying objects in images consisting of a matrix of pixels, each pixel having a known greyness level comprising:
    (a) snippet selection means for selecting portions of images for classification;
    (b) a scene classifier connected to and receiving input from the snippet selection means, said scene classifier containing
        (i) at least two parameter extraction modules selected from the group consisting of edge parameter module, smoothness module, frame parameter module, cuer detection module, highlight and shadow module and texture module, and
        (ii) a Bayesian Classifier connected to and receiving input from said at least two parameter extraction modules.

2. The scene classifier of claim 1 wherein the snippet selection means is comprised of at least one detector selected from the group consisting of shadow and highlight detectors, statistical window detectors and neural network window detectors.

3. The scene classifier of claim 1 wherein the shipper selection means is comprised of at least two detectors selected from the group consisting of shadow and highlight detectors, statistical window detectors and neural network window detectors and also comprising means for combining outputs received from the detectors for transmission to the scene classifier.

4. The scene classifier of claim 1 also comprising means for displaying the images with indicia classifying objects within the image, said means being connected to the Bayesian Classifier.

5. The scene classifier of claim 4 wherein the means for displaying the images is one of a cathode ray tube, a printer and a screen.

6. The scene classifier of claim 4 wherein the indicia is comprised of at least one line encircling at least one classified object.

7. The scene classifier of claim 4 wherein the indicia is comprised of at least one word identifying at least one classified object.

8. The scene classifier of claim 1 wherein the images are sonar images and objects are classified as man-made or natural.

9. The scene classifier of claim 1 wherein the snippet selection means is comprised of a processing unit and memory for storing programs and intermediate results.

10. The scene classifier of claim 1 wherein the edge parameter module performs for each snippet at least one of edge detecting, edge thinning, searching for straight lines, recording characteristics of each straight line found, and determining straightness of the snippet.

11. The scene classifier of claim 1 wherein the smoothness module determines smoothness of a snippet by measuring pixel uniformity in selected directions using selected position patterns.

12. The scene classifier of claim 1 wherein the frame parameter module determines for each snippet at least one of clutter, image mean, image standard deviation and mean shift.

13. The scene classifier of claim 1 wherein the cuer detection module determines at least one of a quantity of object detections from the shipper selection means, areas of each shipper, average area of snippets, distances between centroids of nearby snippets, standard deviation based upon said distances, a matrix of second order moments of centroid point distribution and a ratio of eigenvalues derived from the matrix.

14. The scene classifier of claim 1 wherein the highlight and shadow module determines for each shipper at least one of highlight area, shadow area, highlight extent, shadow extent, average greylevel of highlights, average greylevel of shadows, highlight perimeter, shadow perimeter, highlight blobs, shadow blobs, shadow depth, shadow quality, shadow compactness, number of shadow blobs and area of a shadow blob.

15. The scene classifier of claim 1 wherein the texture module performs for each shipper convolution with templates to detect dots, lines and edges, computation of co-occurrence matrices, and application of Fourier transforms.

16. The scene classifier of claim 1 wherein the Bayesian Classifier contains at least one equation for determining that an object is man-made or natural.

17. A method of classifying into at least one category, objects in an image comprised of a matrix of pixels, each pixel having a known greyness level comprising the steps of:

a) defining a set of windows, each window comprised of a set of adjacent pixels such that each pixel of the image is included in at least one window;

b) classifying each window as a highlight, shadow or background according to the greyness levels of the pixels in each window;

c) selecting those windows which have been classified as containing at least one of a highlight and a shadow;

d) grouping the selected windows into snippets, each snippet containing at least one selected window;

e) determining at least one parameter which is useful for classifying objects in the image and which can be obtained from the greyness levels and position of selected pixels in the image;

f) establishing a probability of objects found in an image being within the at least one category based upon the determined parameters;

g) examining each shipper for the presence and values of the determined parameters; and h) classifying objects within each snippet by comparing the values to the established probability.

18. The method of claim 17 also comprising the step of displaying the image with indicia that classifies objects in the image.

19. The method of claim 17 wherein the image is a sonar image and the objects are classified as natural or man-made.

20. The method of claim 17 wherein the at least one parameter is selected from the group of parameters consisting of straight line characteristics, straightness of the snippet, smoothness of the snippet, clutter, image mean, image standard deviation, mean shift, snippet area, average area of snippets, distances between centroids of nearby snippets, standard deviation based upon said distances, a ratio of eigenvalues derived from a matrix of second order moments of centroid point distribution, highlight area, shadow area, highlight extent, shadow extent, average greylevel of highlights, average greylevel of shadows, highlight perimeter, shadow perimeter, highlight blobs, shadow blobs, shadow depth, shadow quality, shadow compactness, number of shadow blobs, area of shadow blobs, and texture.

* * * * *